US008083466B2

(12) United States Patent  
Zhang et al.

(10) Patent No.: US 8,083,466 B2  
(45) Date of Patent: Dec. 27, 2011

(54) TURBOMACHINE INLET HEATING SYSTEM

(75) Inventors: Hua Zhang, Greer, SC (US); David Wesley Ball, Jr., Easley, SC (US); Valery Ivanovich Ponyavin, Greenville, SC (US); Douglas Scott Byrd, Greer, SC (US)

(73) Assignee: General Electric Company, Schenectady, NY (US)

( * ) Notice: Subject to any disclaimer, the term of this patent is extended or adjusted under 35 U.S.C. 154(b) by 496 days.

(21) Appl. No.: 12/403,444

(22) Filed: Mar. 13, 2009

(65) Prior Publication Data

US 2010/0232945 A1    Sep. 16, 2010

(51) Int. Cl.  
*F01D 21/12* (2006.01)
(52) U.S. Cl. .......... 415/15; 415/416; 415/418; 415/134; 415/135; 60/772; 60/785; 60/795
(58) Field of Classification Search .............. 415/1, 116, 415/118, 134, 135, 145; 60/772, 785, 795  
See application file for complete search history.

(56) References Cited

U.S. PATENT DOCUMENTS

| | | | |
|---|---|---|---|
| 6,027,304 A | 2/2000 | Arar et al. | |
| 6,685,425 B2 | 2/2004 | Poccia et al. | |
| 7,033,135 B2 * | 4/2006 | Mortzheim et al. | .......... 415/115 |

* cited by examiner

*Primary Examiner* — Dung A. Le  
(74) *Attorney, Agent, or Firm* — Cantor Colburn LLP

(57) ABSTRACT

A turbomachine system includes a compressor having a compressor intake and a compressor extraction outlet, and an inlet system fluidly connected to the compressor intake and the compressor extraction outlet. The inlet system includes a plenum having a first end portion that extends to a second end portion through an intermediate portion. The inlet system also includes a heating system having a plurality of conduits extending horizontally through the intermediate portion of the plenum and arranged in a vertical relationship. Heated air from the compressor extraction outlet passes through the plurality of conduits and raises a temperature of ambient air passing through the plenum and into the compressor intake.

12 Claims, 2 Drawing Sheets

TURBOMACHINE INLET HEATING SYSTEM

BACKGROUND OF THE INVENTION

The subject matter disclosed herein relates to turbomachines and, more particularly, to an inlet heating system for a gas turbine.

In some gas turbine applications, there are instances of gas turbine plant operation where gas turbine pressure ratio reaches an operating pressure ratio limit of the compressor causing compressor surge. The compressor pressure ratio is typically larger than the turbine pressure ratio in that the latter is subject to pressure loss in the combustor. In order to provide compressor pressure ratio protection, compressor discharge air is bled off and re-circulated to the compressor inlet. This method of operation, known as inlet bleed heat (IBH) control, raises inlet temperature of the compressor inlet by mixing colder ambient air with the bleed portion of the hot compressor discharge air.

Conventionally, in order to maintain compressor inlet temperatures within a small range, a large number of vertical manifolds are arranged between the bleed air and the compressor inlet. While the vertical manifolds provide mixing in the horizontal plane, temperature gradients remain within the bleed air making it difficult to maintain the compressor inlet temperature within the small range.

BRIEF DESCRIPTION OF THE INVENTION

According to one aspect of the invention, a turbomachine includes a compressor having a compressor intake and a compressor extraction outlet, and an inlet system fluidly connected to the compressor intake and the compressor extraction outlet. The inlet system includes a plenum having a first end portion that extends to a second end portion through an intermediate portion. The first end portion defines an inlet for receiving ambient air and the second end portion defines an outlet for compressor intake air. The inlet system also includes a heating system having a plurality of conduits extending horizontally through the intermediate portion of the plenum and arranged in a vertical relationship. Each of the plurality of conduits includes a first end section, a second end section and an intermediate section with at least one of the first and second end sections being fluidly connected to the compressor extraction outlet. Heated air from the compressor extraction outlet passes through the plurality of conduits and raises a temperature of ambient air passing through the plenum and into the compressor intake.

According to another aspect of the invention, a method of heating inlet air to a turbomachine includes guiding ambient air into a first end portion of plenum, passing the ambient air across a plurality of conduits extending horizontally through an intermediate portion of the plenum and arranged in a vertical relationship, introducing heated compressor extraction air into the plurality of conduits, and transferring heat from the heated compressor extraction air to the ambient air passing through the plenum.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
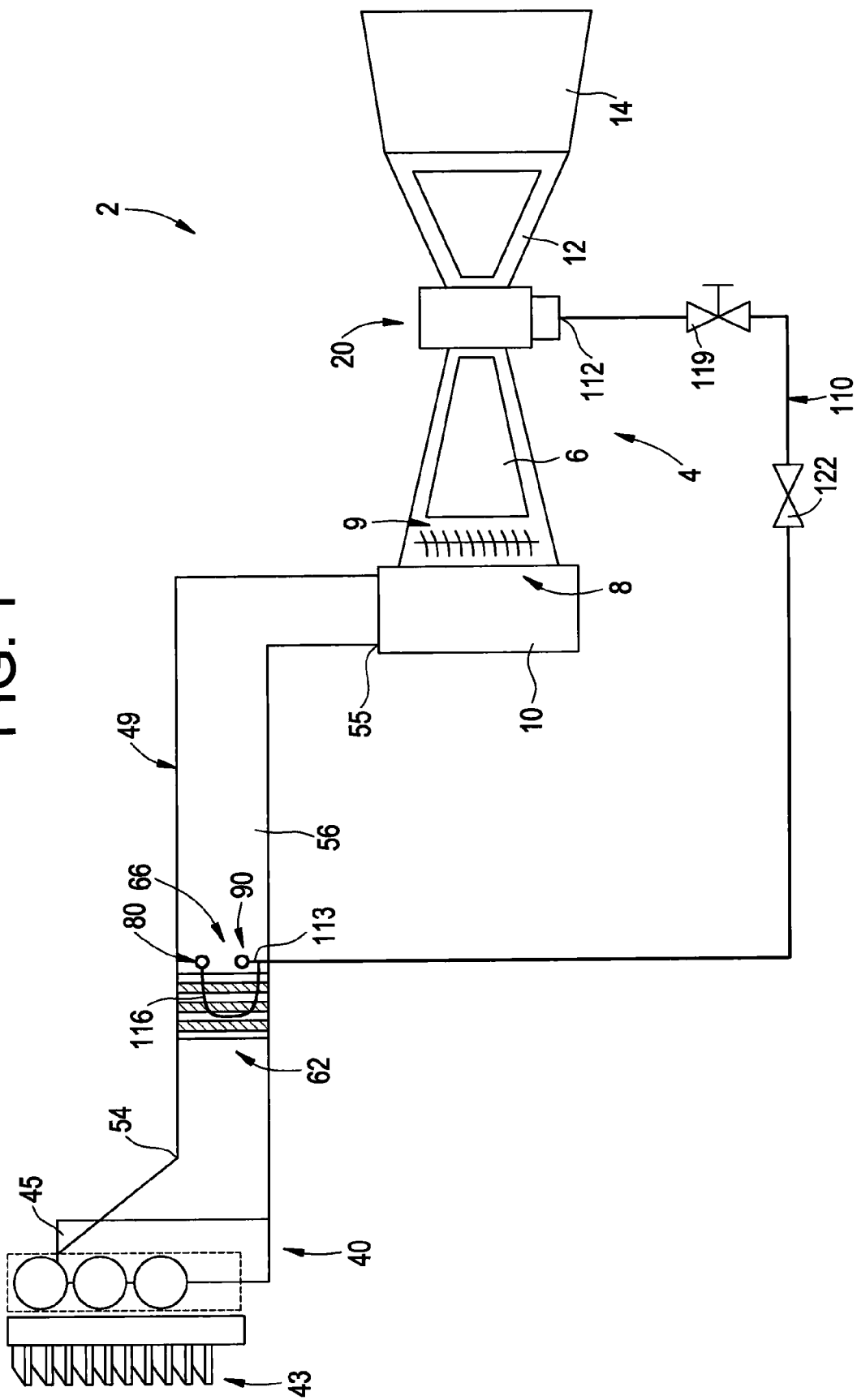
FIG. 1 is block diagram illustration a turbomachine including an inlet heating system in accordance with an exemplary embodiment.

With reference to FIG. 1, a turbomachine system constructed in accordance with an exemplary embodiment is indicated generally at 2. Turbomachine system 2 includes a gas powered turbomachine 4 having a compressor 6 provided with a compressor intake 8. Compressor intake 8 is shown to include a plurality of inlet guide veins 9 arranged downstream of an inlet plenum 10. Gas powered turbomachine 4 is further shown to include a turbine 12 fluidly connected to an exhaust diffuser 14. In the exemplary embodiment shown, compressor 6 is operatively linked to turbine 12 through a compressor extraction outlet or manifold 20.

In further accordance with the exemplary embodiment, turbomachine system 2 includes an inlet system 40 having a louvered intake 43 mounted to an inlet filter house 45. Louvered intake 43 is fluidly connected to inlet plenum 10 via a plenum 49. Plenum 49 includes a first end portion 54 that extends to a second end portion 55 through an intermediate portion 56. Intake system 40 is also shown to include an inlet silencer 62 arranged downstream from inlet filter house 45 as well as an inlet heating system 66 arranged downstream from inlet silencer 62.

Figure 2:
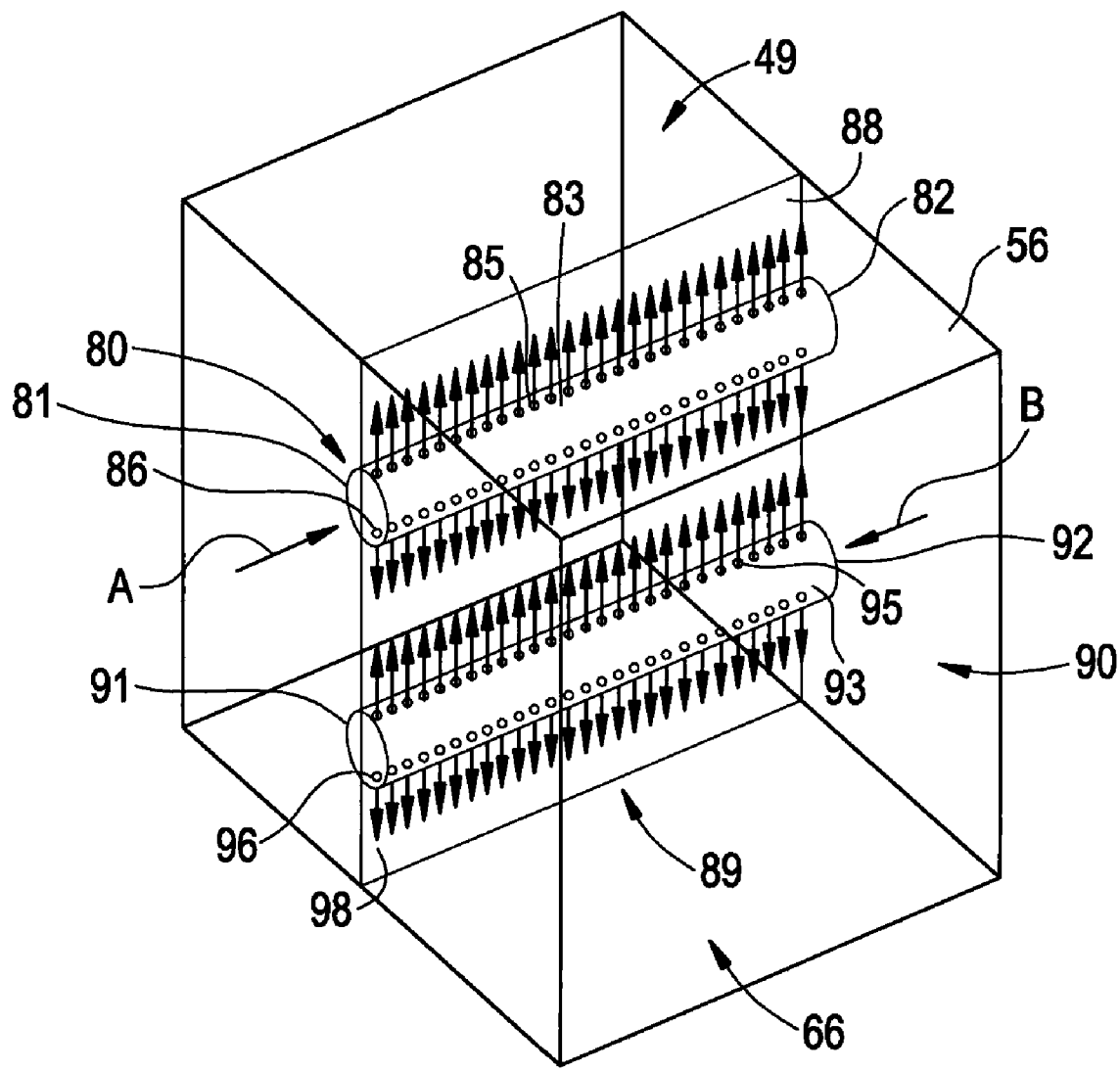
FIG. 2 is schematic illustration the inlet heating system of FIG. 1.

As best shown in FIG. 2, inlet heating system 66 includes a first conduit 80 having a first end section 81 that extends to a second end section 82 through an intermediate section 83. First conduit 80 includes a first plurality of openings 85 and an opposing second plurality of openings 86. With this arrangement, first conduit 80 establishes a first portion 88 of a vertical curtain of heated air 89. Inlet heating system 66 is also shown to include a second conduit 90 having a first end section 91 that extends to a second end section 92 through an intermediate section 93. Second conduit 90 includes a first plurality of openings 95 and an opposing second plurality of openings 96 that, in a manner similar to that described above with respect to first conduit 80 establishes a second portion 98 of the a vertical curtain of heated air 89.

First and second conduits 80 and 90 are fluidly connected extraction manifold 20 via an extraction air delivery conduit 110. Extraction air delivery conduit 110 includes a first end 112 fluidly connected to compressor extraction manifold 20 that extends to a second end 113 that is fluidly connected to inlet heating system 66. More specifically, second end 113 of extraction air delivery conduit 110 is fluidly connected to second end portion 92 of second conduit 90. A connection member 116 extends from second end 113 and is fluidly connected to first end section 81 of first conduit 80. Extraction air delivery conduit 110 is further shown to include a valve member 119 and a control valve 122. Valve member 119 is selectively activated to deliver a heated air flow to inlet heating system 66. With this arrangement, opposing heated airflows, as indicated by arrows A and B, are passed through first and second conduits 80 and 90. The opposing heated air flows pass through the plurality of openings 85, 86 and 95, 96 to establish the vertical curtain of heated air 89 within plenum 49.

It has been found that the use of only two pipes arranged along a horizontal plane and in a vertical orientation relative to one another exchange sufficient heat with the inlet air flow in order to enhance turbomachine operation without creating significant impact on compressor reliability. That is, in contrast to the conventional multiple, vertically oriented, horizontal rows of heating pipes that require considerable amounts piping materials, the use of two horizontal conduits has been surprisingly found to achieve a better mixing effect. More specifically, despite the smaller surface are of the two conduits, the vertical curtain of heated air sufficiently elevates the temperature of the inlet air uniformly to compressor 4 so as to enhance turbomachine operation.

At this point, it should be understood that the present invention provides a system for heating inlet air to a turbomachine that employs only two horizontally oriented conduits that are in a heat exchange relationship with inlet air to a turbomachine. The lower surface area of the two conduits leads to lower energy losses thereby enhancing turbomachine operation by creating a uniform temperature distribution for the compressor. It should also be understood that the particular size of the plurality of openings, the distance between the plurality of openings and the orientation of the openings along the conduits can vary and would depend upon inlet geometry and turbomachine heating requirements.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine system comprising:
    a compressor including a compressor intake and a compressor extraction outlet; and
    an inlet system fluidly connected to the compressor intake and the compressor extraction outlet, the inlet system including:
        a plenum including a first end portion that extends to a second end portion through an intermediate portion, the first end portion defining an inlet for receiving ambient air and the second end portion defining an outlet for compressor intake air;
        a heating system including a plurality of conduits extending horizontally through the intermediate portion of the plenum and arranged in a vertical relationship, each of the plurality of conduits including a first end section, a second end section and an intermediate section, at least one of the first and second end sections being fluidly connected to the compressor extraction outlet, wherein heated air from the compressor extraction outlet passing through the plurality of conduits raises a temperature of ambient air passing through the plenum and into the compressor intake.

2. The turbomachine system according to claim 1, wherein each of the plurality of conduits includes a plurality of outlet openings through which pass the heated air from the compressor extraction outlet into the plenum.

3. The turbomachine system according to claim 2, wherein the plurality of outlet openings in each of the plurality of conduits are arranged to discharge heated extraction air along a vertical plane within the plenum.

4. The turbomachine system according to claim 1, wherein the plurality of conduits comprises a first conduit and a second conduit.

5. The turbomachine system according to claim 4, wherein the first end section of the first conduit defines a heated extraction air inlet and the second end section of the second conduit defines a heated extraction air inlet, wherein the heated extraction air passing through the first and second conduits flow in opposing directions.

6. The turbomachine system according to claim 1, wherein the plurality of conduits comprises no more than two conduits.

7. A method of heating inlet air to a turbomachine, the method comprising:
    guiding ambient air into a first end portion of plenum;
    passing the ambient air across a plurality of conduits extending horizontally through an intermediate portion of the plenum and arranged in a vertical relationship;
    introducing heated compressor extraction air into the plurality of conduits; and
    transferring heat from the heated compressor extraction air to the ambient air passing through the plenum.

8. The method of claim 7, wherein transferring heat from the heated compressor extraction air to the ambient air comprises passing the heated compressor extraction air through openings formed in the plurality of conduits and into the ambient air.

9. The method of claim 8, wherein passing the heated compressor extraction air through openings formed in the plurality of conduit members comprises forming a vertical curtain of heated air within the plenum.

10. The method of claim 7, wherein introducing the heated compressor extraction air into the plurality of conduits comprises introducing the heated compressor extraction air into no more than two conduits.

11. The method of claim 7, wherein introducing the heated compressor extraction air into the plurality of conduits comprises introducing the heated compressor extraction air into a first conduit and a second conduit.

12. The method of claim 11, further comprising:
    passing the heated extraction air into a first end portion of the first conduit in a first direction; and
    flowing the heated extraction air into a second end portion of the second conduit in a second direction, the second direction being opposite the first direction.

* * * * *